US012321354B1

(12) United States Patent
Thomas et al.

(10) Patent No.: US 12,321,354 B1
(45) Date of Patent: Jun. 3, 2025

(54) MANAGING CONTINUITY IN DATA PIPELINE (71) Applicant: International Business Machines Corporation, Armonk, NY (US)

(72) Inventors: Binoy Thomas, Kozhikode (IN); Sudheesh S. Kairali, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/527,816

(22) Filed: Dec. 4, 2023

(51) Int. Cl.
*G06F 16/2455* (2019.01)
*G06F 16/188* (2019.01)
*G06F 16/2458* (2019.01)

(52) U.S. Cl.
CPC ...... *G06F 16/24568* (2019.01); *G06F 16/188* (2019.01); *G06F 16/2465* (2019.01)

(58) Field of Classification Search
CPC ............ G06F 16/24568; G06F 16/188; G06F 16/2465
See application file for complete search history.

(56) References Cited

U.S. PATENT DOCUMENTS

| | | | |
|---|---|---|---|
| 10,168,691 B2 | 1/2019 | Zornio | |
| 10,728,111 B2 | 7/2020 | Bellini | |
| 10,853,338 B2 | 12/2020 | Meacham | |
| 11,620,565 B1 * | 4/2023 | Tariq | G06F 16/2455 706/25 |
| 11,663,219 B1 | 5/2023 | Profirovic | |
| 2005/0010558 A1 * | 1/2005 | Dettinger | G06F 16/2455 |
| 2007/0050328 A1 * | 3/2007 | Li | G06F 16/9032 |
| 2017/0063724 A1 * | 3/2017 | Cao | G06F 16/24568 |
| 2023/0259441 A1 | 8/2023 | Haile | |
| 2023/0259518 A1 | 8/2023 | Renick | |
| 2024/0202247 A1 * | 6/2024 | Kobayashi | G06F 16/9024 |

OTHER PUBLICATIONS

"Data Lake Solutions", IBM, Printed Oct. 12, 2023, 9 pages, <https://www.ibm.com/data-lake?utm_content=SRCWW&p1=Search&p4=43700050331863061&p5=e&gclid=e386e86aba3a17625c7d8be73c473961&gclsrc=3p.ds>.

(Continued)

*Primary Examiner* — Tony Wu
(74) *Attorney, Agent, or Firm* — Edward J. Wixted, III (57) ABSTRACT

In an approach for managing data continuity of a data storage system, a processor analyzes queries received by the data storage system from a plurality of data sources. A processor identifies a query frequency and response time for queries from each data source of the plurality of data sources. A processor derives an expected data pipeline continuity requirement for each data source based on respective query frequency and respective response time for the respective queries from each data source. A processor learns patterns of the analyzed queries to enable predictions for when future queries from each data source will occur and identification of an unavailability pattern for each data source. A processor determines recommendations for maintaining data continuity for the data storage system based on the expected data pipeline continuity requirement for each data source, the query predictions, and the unavailability pattern for each data source.

18 Claims, 2 Drawing Sheets

(56) References Cited

OTHER PUBLICATIONS

"IBM Acquires Databand to Extend Leadership in Observability", Databand, Jul. 6, 2022, 4 pages, <https://databand.ai/blog/ibm-acquires-databand-to-extend-leadership-in-observability>.

Quemy, Alexandre, "Data Pipeline Selection and Optimization", Published in the Workshop Proceedings of the EDBT/ICDT 2019 Joint Conference, Mar. 26, 2019, Lisbon, Portugal, 6 pages, <https://www.researchgate.net/publication/331564617_Data_Pipeline_Selection_and_Optimization>.

Yackel Ryan, "Re-Imagining Data Observability", Databand, Nov. 4, 2022, 12 pages, <https://databand.ai/blog/re-imagining-data-observability>.

\* cited by examiner

MANAGING CONTINUITY IN DATA PIPELINE

BACKGROUND OF THE INVENTION

The present invention relates generally to the field of data processing, and more particularly to a method and system for managing continuity in data pipeline and predicting actions based on criticality of data attribute.

Generation of data and having real-time access to that data is critical more than ever nowadays. Data continuity is the ability to maintain the data information in such a way that the data information continues to be available and therefore usable. Data continuity and availability tend to go hand in hand with network availability.

SUMMARY

Aspects of an embodiment of the present invention disclose a method, computer program product, and computer system for managing continuity in data pipeline and predicting actions based on criticality of data attribute. One or more processors analyze queries received by the data storage system from a plurality of data sources. One or more processors identify a query frequency and response time for queries from each data source of the plurality of data sources. One or more processors derive an expected data pipeline continuity requirement for each data source based on respective query frequency and respective response time for the respective queries from each data source. One or more processors learn patterns of the analyzed queries to enable predictions for when future queries from each data source will occur and identification of an unavailability pattern for each data source. One or more processors determine recommendations for maintaining data continuity for the data storage system based on the expected data pipeline continuity requirement for each data source, the query predictions, and the unavailability pattern for each data source In some embodiments of the present invention, one or more processors identify a query success rate, size of data request, and data transfer throughput for each query of the analyzed queries.

In some embodiments of the present invention, the expected data pipeline continuity requirement is a periodic measure calculated by adding the respective query frequency and the respective response time for the respective queries for a respective data source.

In some embodiments of the present invention, the unavailability pattern for each data source is a pattern of a time period a respective data source is unreachable or throughput is below a pre-defined threshold.

In some embodiments of the present invention, the recommendations are at least one of a modification to a future query and a system modification to the data storage system.

In some embodiments of the present invention, the system modification is at least one of assigning more cloud resources to the data storage system and temporarily moving query engine of the data storage system to a higher bandwidth virtual network.

In some embodiments of the present invention, the modification to the future query is adjusting a query period of an upcoming query as predicted in the query predictions and pre-fetching or post-fetching data requested in the upcoming query based on the adjusted query period, and wherein the adjusted query period avoids an unavailability period for a respective data source based on the unavailability pattern for the respective data source.

These and other features and advantages of the present invention will be described in, or will become apparent to those of ordinary skill in the art in view of, the following detailed description of the example embodiments of the present invention.

DETAILED DESCRIPTION

With the growing use of huge data storage and analytics ecosystems, such as a data fabric and a data lakehouse, prediction of data availability and throughput from multiple sources querying and/or ingesting data (i.e., reading and writing data) within these ecosystems is possible. A data fabric is an architecture and set of data services that provide consistent capabilities (i.e., standard data management practices) across a choice of endpoints spanning hybrid multi-cloud environments. A data lakehouse is a data platform that merges aspects of data warehouses and data lakes into one data management solution that leverages cloud object storage to store a broader range of data types-structured, unstructured, and semi-structured data.

Embodiments of the present invention recognize that there can be multiple data sources continuously ingesting data to a data lake, such as databases, Internet of Things (IoT) edge nodes, etc. The data can be structured or unstructured data with varying attributes such that some of the data is used in real-time analytics (e.g., weather data or real-time election data) and some of the data is used in periodic analytics (e.g., quarterly financial data). Some of data used for real-time analytics is expected continuously but is still usable if accuracy is reduced within a threshold (e.g., weather data). While some of the data used for periodic analytics is not expected continuously and delays are acceptable for preparing results but there is not any tolerance for changes in accuracy (e.g., financial data). Thus, embodiments of the present invention recognize that there is a need for a way to manage data continuity and predict actions that need to be taken in order to maintain the data continuity for a data pipeline.

Embodiments of the present invention provide a system and method for managing data continuity in a data pipeline and predicting actions to be taken by the system based on data visibility (i.e., visibility of data size and throughput) and criticality of data attribute (i.e., how often data is expected to be queried). Generally, for large data storage systems, such as a data lakehouse or data fabric ecosystem, a majority of queries and data ingestions from a plurality of data sources are periodic or continuous rather than random. Embodiments of the present invention are implemented in a large-scale data storage system and used to identify and analyze these periodic or continuous data queries and ingestions from a plurality of data sources and learn patterns associated with the data queries/ingestions to train the system to predict when a future similar query will occur at the large data storage system. Embodiments of the present invention derive an expected data pipeline continuity requirement for each data source based on the identified patterns of repeated queries, i.e., query frequency and query response time. When a surge of data is received by the data storage system, i.e., more than a pre-defined threshold of data is received, embodiments of the present invention propose actions that need to be taken to ensure data continuity in the data pipeline, such as system modifications (e.g., assigning more cloud resources, temporarily moving query engine to higher bandwidth virtual network, etc.) or query modifications.

Implementation of embodiments of the present invention may take a variety of forms, and exemplary implementation details are discussed subsequently with reference to the Figures.

Various aspects of the present disclosure are described by narrative text, flowcharts, data block diagrams of computer systems and/or data block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart data blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
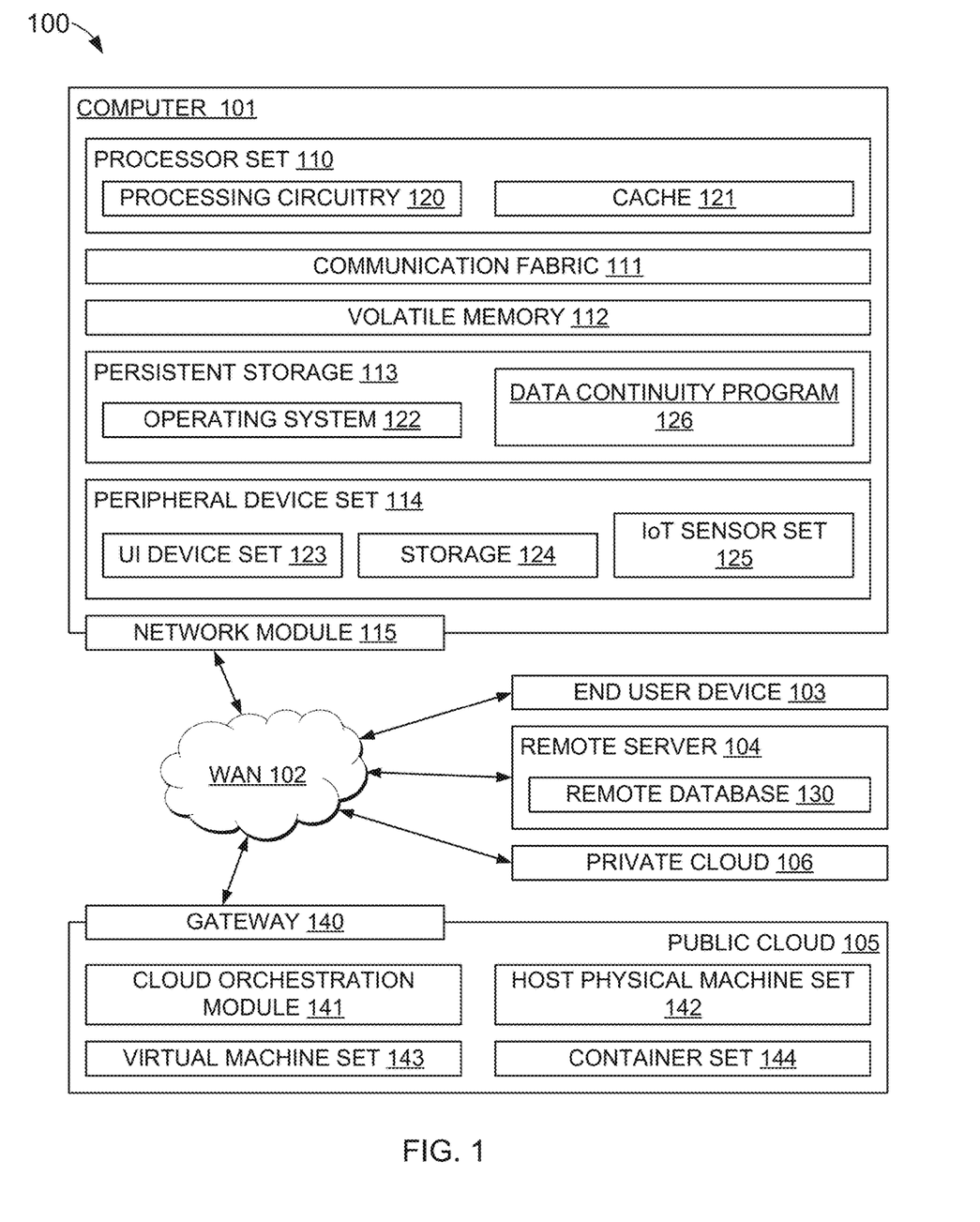
FIG. 1 is a functional data block diagram illustrating a computing environment, for running a data continuity program, in accordance with an embodiment of the present invention.

In FIG. 1, computing environment 100 contains an example of an environment for the execution of at least some of the computer code involved in performing the inventive methods, such as data continuity program 126. In addition to data continuity program 126, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and data continuity program 126), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processors set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in data block 116 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in data block 116 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Data continuity program 126 operates to manage data continuity in a data pipeline of a data storage system and predict actions to be taken by the system based on data visibility (i.e., visibility of data size and throughput) and/or criticality of data attribute. In the depicted embodiment, data continuity program 126 is a standalone program. In another embodiment, data continuity program 126 may be integrated into another software product, e.g., a data storage system management product or package. The detailed steps of data continuity program 126 are depicted and described in further detail with respect to FIG. 2.

Figure 2:
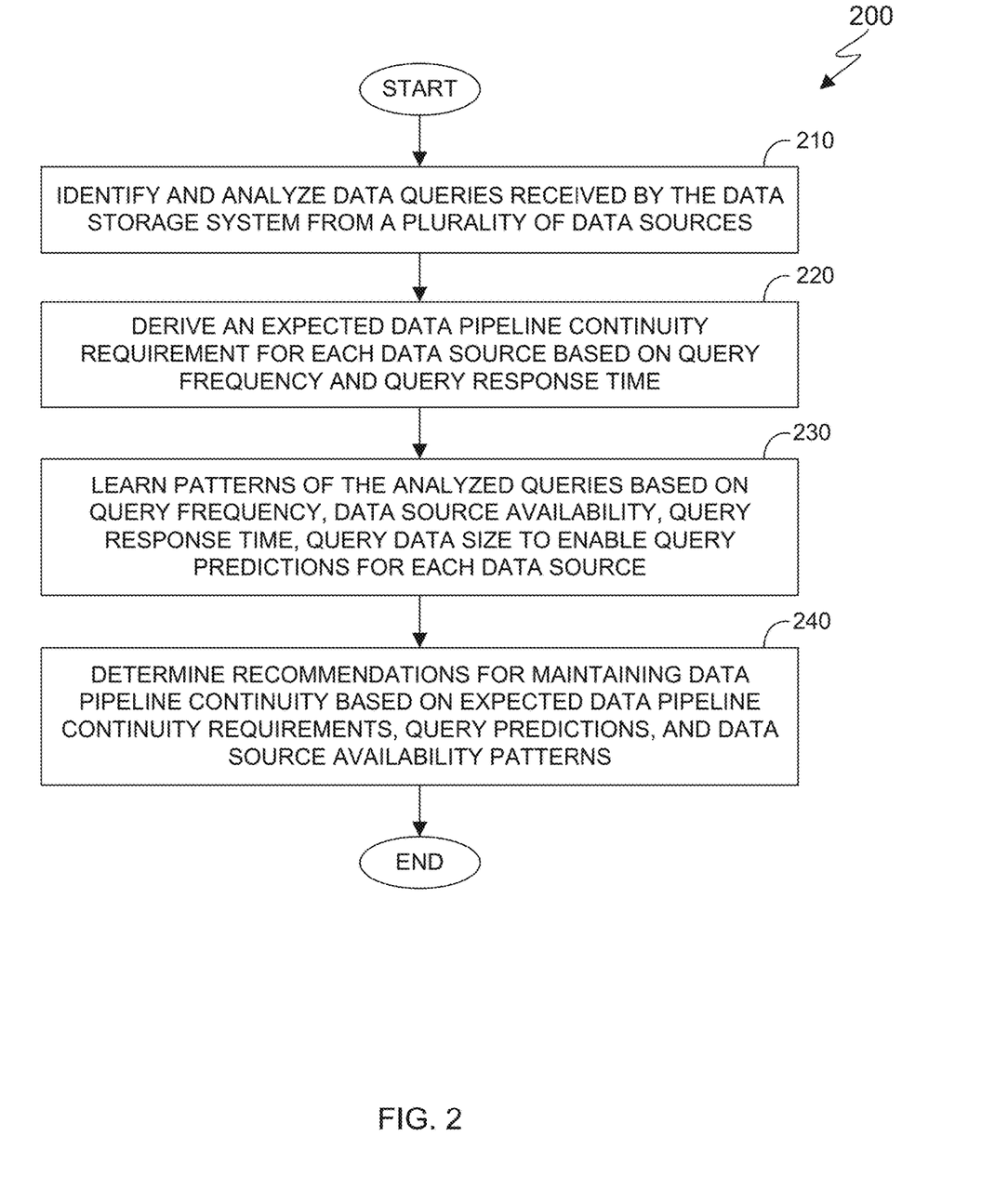
FIG. 2 is a flowchart depicting operational steps of the data continuity program, for managing continuity in data pipeline and predicting actions based on data visibility, running on a computer of the distributed data processing environment of FIG. 1, in accordance with an embodiment of the present invention.

FIG. 2 is a flowchart, generally designated 200, illustrating the operational steps for data continuity program 126, running on computer 101 of computing environment 100 of FIG. 1, in accordance with an embodiment of the present invention. In an embodiment, data continuity program 126 operates to manage data continuity in a data pipeline of a data storage system ("the system") and predict actions to be taken by the system based on data visibility (i.e., visibility of data size and throughput) and criticality of data attribute. It should be appreciated that the process depicted in FIG. 2 illustrates one possible iteration of the process flow in which some steps are performed periodically, such as the monitoring and gathering of statistical data of the data storage system and then the making of system recommendations based on the statistical data.

In step 210, data continuity program 126 identifies and analyzes data queries and data ingestions received by the data storage system from a plurality of data sources, such as databases and edge devices (e.g., a remote industry device sending IoT data). In an embodiment, data continuity program 126 analyzes information associated with these data queries/ingestions including metadata to identify and learn query frequency, response time of the system, size of data requested, etc. for queries from each data source of the plurality of data sources. In an embodiment, data continuity program 126 identifies repeating queries from the analyzed information.

In an embodiment, for the queries/ingestions of each data source, data continuity program 126 keeps records (i.e., stores records) of statistical data associated with the identified and analyzed queries including: (1) the respective data source, (2) query success rate and response time, (3) size of data request and data transfer throughput at different time periods (e.g., hour of day or day of the week), and (4) frequency at which data is expected to be queried from data sources. In an embodiment, data continuity program 126 uses the statistical data to determine a data source unavailability pattern for each data source (i.e., a pattern of time periods in which a respective data source is unreachable or throughput from the respective data source is below pre-defined threshold) (e.g., unstable data sources such as edge nodes). In an embodiment, data continuity program 126 keeps track of an availability pattern of data sources based on the determined unavailability pattern for each data source. More frequent queries will contribute to more statistical data, i.e., a query frequency of every 10 minutes will contribute to hourly, daily, and monthly statistical data but a less frequent query, i.e., monthly query, will contribute only to monthly statistical data.

In an embodiment, data continuity program 126 enables a user to define a threshold for identifying queries and data ingestions having a threshold percentage, or number, of failures or have a performance/throughput lower than the defined threshold. In some embodiments, this pre-defined threshold is used by data continuity program 126 to determine when a data source is unavailable and helps in learning the unavailability pattern of a data source. In an embodiment, data continuity program 126 enables a user to define an analysis time window (hourly, daily, or monthly, etc.) for identifying the queries and data ingestions that meet the defined threshold and analyzing and comparing the query response time, query success rate, and query throughput of queries/data ingestions received during the defined time window. In an embodiment, data continuity program 126 periodically performs this step by monitoring for data queries and/or data ingestions received by the system and analyzing them to gather and record as statistical data. In an embodiment, from the statistical data over time (iterations of this step), data continuity program 126 creates multiple records for data source availability and throughput for different time windows/periods, such as hourly, daily, and monthly.

In step 220, data continuity program 126 derives an expected data pipeline continuity requirement for each data source based on query frequency and query response time of queries for each respective data source. In an embodiment, data continuity program 126 derives (i.e., calculates) an expected data pipeline continuity requirement (i.e., periodic measure) for each data source using the query frequency and query response time, i.e., by adding the query frequency time period to the query response time period, identified for each data source. For example, for data source A, if the query frequency is every hour and the query response time is 10 minutes, data continuity program 126 calculates the expected data pipeline continuity requirement to be one hour plus ten minutes or 1 hour and 10 minutes.

In step 230, data continuity program 126 learns patterns of the analyzed queries based on the identified query frequency, data source availability, query response time, query data size, etc. for each data source to enable query predictions for each data source. In an embodiment, data continuity program 126 utilizes the learned patterns based on the statistical data to predict when a query will occur from a data source, the query's success, and a throughput (i.e., performance) of the query. In an embodiment, data continuity program 126 predicts upcoming (i.e., future) queries for at least one of the plurality of data sources based on the learned patterns from the statistical data.

In step 240, data continuity program 126 determines recommendations for maintaining data pipeline continuity based on expected data pipeline continuity requirements, query predictions, and data source availability/unavailability patterns. In an embodiment, data continuity program 126 periodically (e.g., every pre-defined time period or after pre-defined number of queries have been received) determines recommendations for maintaining data pipeline continuity based on the expected data pipeline continuity requirements, the query predictions, and the data source availability/unavailability patterns as statistical data is gathered (i.e., as more and more queries are received and analyzed). In an embodiment, data continuity program 126 determines recommendations by comparing upcoming query predictions against the expected data pipeline continuity requirements and data source availability/unavailability patterns for respective data sources of upcoming queries. The recommendations are actions to be taken in the form of modifications to upcoming queries and/or system modifications (e.g., assigning more cloud resources to the data storage system or temporarily moving query engine of data storage system to a higher bandwidth virtual network). In some embodiments, data continuity program 126 sends determined recommendations to a user for determining whether to implement the recommendations. In other embodiments, data continuity program 126 data continuity program 126 proactively implements or automatically performs the determined recommendations.

In an example embodiment, if data source A has a query frequency of 3 hours, response time of 30 minutes, an expected data pipeline continuity requirement of 3.5 hours, has a pattern of unavailability of 1 hour every day at a certain time, and a next detected query cannot be completed with its response time because the query will occur during the unavailability time window, data continuity program 126 recommends to optimize the upcoming query by adjusting the query period (i.e., the length of time the query takes to occur) by minimizing data size of the query so that the query can be completed before the unavailability hence maintaining data continuity for the data storage system. In another embodiment, if the unavailability of a data source is very short with respect to its expected data pipeline continuity (e.g., if unavailability is 5 minutes and expected data pipeline continuity requirement is 6.5 hours, a change of 5 minutes in a 6.5 hour period can be acceptable), data continuity program 126 performs prefetching or post fetching of data requested by queries based on changing the query period to avoid the unavailability window.

Responsive to predicting that a next query cannot be completed within a normal response time, data continuity program 126 analyzes whether the next query should be modified by adjusting the query period (i.e., time when a query is predicted to occur) with respect to an expected outage or whether pre-fetching or post-fetching of the data should occur. If modifying the query improves data continuity to the expected data continuity requirement, then data continuity program 126 will proceed with the modification. If modifying the query does not improve data continuity to the expected data continuity requirement, then data continuity program 126 will recommend or proactively pre-fetch or post-fetch the data to avoid unnecessary queries during the outage.

In an embodiment, responsive to detecting a surge in data or delay in response time of incoming queries more than a predefined threshold, data continuity program 126 recommends system modifications, e.g., assigning more cloud resources or temporarily moving query engine to a higher bandwidth virtual network, to ensure the expected data continuity requirement for different data sources can be met by the system. The predefined threshold can be defined by a user or system administrator to be a number or percentage of increase in data queried or delay in response time that when achieved will trigger a system modification recommendation.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    analyzing, by one or more processors, queries received by a data storage system from a plurality of data sources;
    identifying, by one or more processors, a query frequency and response time for queries from each data source of the plurality of data sources;
    deriving, by one or more processors, an expected data pipeline continuity requirement time period for each data source based on the respective query frequency and the respective response time for the respective queries from each data source;
    learning, by one or more processors, patterns of the analyzed queries to enable predictions for when future queries from each data source will occur and identification of an unavailability pattern for each data source;
    determining, by the one or more processors, a recommendation for maintaining data continuity for the data storage system based on the expected data pipeline continuity requirement time period for each data source, the query predictions, and the unavailability pattern for each data source; and automatically, by one or more processors, performing a system modification to the data storage system in accordance with the determined recommendation, wherein the system modification comprises temporarily moving a query engine of the data storage system to a higher bandwidth virtual network.

2. The computer-implemented method of claim 1, further comprising:
identifying, by one or more processors, a query success rate, size of data request, and data transfer throughput for each query of the analyzed queries.

3. The computer-implemented method of claim 1, wherein the expected data pipeline continuity requirement is a periodic measure calculated by adding the respective query frequency and the respective response time for the respective queries for a respective data source.

4. The computer-implemented method of claim 1, wherein the unavailability pattern for each data source is a pattern of a time period a respective data source is reachable with throughput is below a pre-defined threshold.

5. The computer-implemented method of claim 1, wherein the recommendation further comprises a modification to a future query.

6. The computer-implemented method of claim 5, wherein:
the modification to the future query is adjusting a length of time an upcoming query takes to occur by minimizing data size of the upcoming query as predicted in the query predictions and pre-fetching data requested in the upcoming query; and
the adjusted length of time of the upcoming query avoids an unavailability period for a respective data source based on the unavailability pattern for the respective data source.

7. A computer program product comprising:
one or more computer readable storage media and program instructions collectively stored on the one or more computer readable storage media, the program instructions comprising:
program instructions to analyze queries received by a data storage system from a plurality of data sources;
program instructions to identify a query frequency and response time for queries from each data source of the plurality of data sources;
program instructions to derive an expected data pipeline continuity requirement time period for each data source based on the respective query frequency and the respective response time for the respective queries from each data source;
program instructions to learn patterns of the analyzed queries to enable predictions for when future queries from each data source will occur and identification of an unavailability pattern for each data source;
program instructions to determine a recommendation for maintaining data continuity for the data storage system based on the expected data pipeline continuity requirement time period for each data source, the query predictions, and the unavailability pattern for each data source; and
program instructions to automatically perform a system modification to the data storage system in accordance with the determined recommendation, wherein the system modification comprises temporarily moving a query engine of the data storage system to a higher bandwidth virtual network.

8. The computer program product of claim 7, further comprising:
program instructions, collectively stored on the one or more computer readable storage media, to identify a query success rate, size of data request, and data transfer throughput for each query of the analyzed queries.

9. The computer program product of claim 7, wherein the expected data pipeline continuity requirement is a periodic measure calculated by adding the respective query frequency and the respective response time for the respective queries for a respective data source.

10. The computer program product of claim 7, wherein the unavailability pattern for each data source is a pattern of a time period a respective data source is reachable with throughput is below a pre-defined threshold.

11. The computer program product of claim 7, wherein the recommendation further comprises a modification to a future query.

12. The computer program product of claim 11, wherein:
the modification to the future query is adjusting a length of time an upcoming query takes to occur by minimizing data size of the upcoming query as predicted in the query predictions and pre-fetching data requested in the upcoming query; and
the adjusted length of time of the upcoming query avoids an unavailability period for a respective data source based on the unavailability pattern for the respective data source.

13. A computer system comprising:
one or more computer processors;
one or more computer readable storage media;
program instructions collectively stored on the one or more computer readable storage media for execution by at least one of the one or more computer processors, the stored program instructions comprising:
program instructions to analyze queries received by a data storage system from a plurality of data sources;
program instructions to identify a query frequency and response time for queries from each data source of the plurality of data sources;
program instructions to derive an expected data pipeline continuity requirement time period for each data source based on the respective query frequency and the respective response time for the respective queries from each data source;
program instructions to learn patterns of the analyzed queries to enable predictions for when future queries from each data source will occur and identification of an unavailability pattern for each data source;
program instructions to determine a recommendation for maintaining data continuity for the data storage system based on the expected data pipeline continuity requirement time period for each data source, the query predictions, and the unavailability pattern for each data source; and
program instructions to automatically perform a system modification to the data storage system in accordance with the determined recommendation, wherein the system modification comprises temporarily moving a query engine of the data storage system to a higher bandwidth virtual network.

14. The computer system of claim 13, further comprising:
program instructions, collectively stored on the one or more computer readable storage media for execution by at least one of the one or more computer processors, to identify a query success rate, size of data request, and data transfer throughput for each query of the analyzed queries.

15. The computer system of claim 13, wherein the expected data pipeline continuity requirement is a periodic measure calculated by adding the respective query frequency and the respective response time for the respective queries for a respective data source.

16. The computer system of claim 13, wherein the unavailability pattern for each data source is a pattern of a time period a respective data source is reachable with throughput is below a pre-defined threshold.

17. The computer system of claim 13, wherein the recommendation further comprises a modification to a future query.

18. The computer system of claim 17, wherein:
the modification to the future query is adjusting a length of time an upcoming query takes to occur by minimizing data size of the upcoming query as predicted in the query predictions and pre-fetching data requested in the upcoming query; and
the adjusted length of time of the upcoming query avoids an unavailability period for a respective data source based on the unavailability pattern for the respective data source.

* * * * *